(12) United States Patent
DiGiovanna

(10) Patent No.: US 8,746,571 B2
(45) Date of Patent: Jun. 10, 2014

(54) METHOD AND APPARATUS FOR REPRESENTING STATE OF CHARGE ON BATTERY

(75) Inventor: Robert W. DiGiovanna, Shirley, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 37 days.

(21) Appl. No.: 13/454,131

(22) Filed: Apr. 24, 2012

(65) Prior Publication Data
US 2013/0277431 A1 Oct. 24, 2013

(51) Int. Cl.
*G06K 7/10* (2006.01)

(52) U.S. Cl.
USPC .................................. 235/462.42; 235/462.25

(58) Field of Classification Search
USPC .................... 235/462.42, 462.25, 462.45
See application file for complete search history.

(56) References Cited

U.S. PATENT DOCUMENTS

| | | | |
|---|---|---|---|
| 6,215,280 B1 | 4/2001 | Cavazzini | |
| 7,593,782 B2 | 9/2009 | Jobs et al. | |
| 7,876,068 B2 | 1/2011 | Faunce et al. | |
| 2003/0001018 A1* | 1/2003 | Hussey et al. | 235/472.01 |
| 2007/0181678 A1 | 8/2007 | Nilsson et al. | |
| 2010/0063758 A1 | 3/2010 | Yu et al. | |
| 2011/0124383 A1 | 5/2011 | Garra et al. | |

* cited by examiner

*Primary Examiner* — Ahshik Kim
(74) *Attorney, Agent, or Firm* — Nong-Qiang Fan

(57) ABSTRACT

An apparatus includes a battery in the housing, a first light indicator operative to emit light in a first color with the duration of a first time period after a predetermined triggering event, and a second light indicator operative to emit light in a second color with the duration of a second time period after the predetermined triggering event. The ratio between the first time period and the second time period monotonically depends upon a state of charge on the battery.

20 Claims, 5 Drawing Sheets

METHOD AND APPARATUS FOR REPRESENTING STATE OF CHARGE ON BATTERY

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
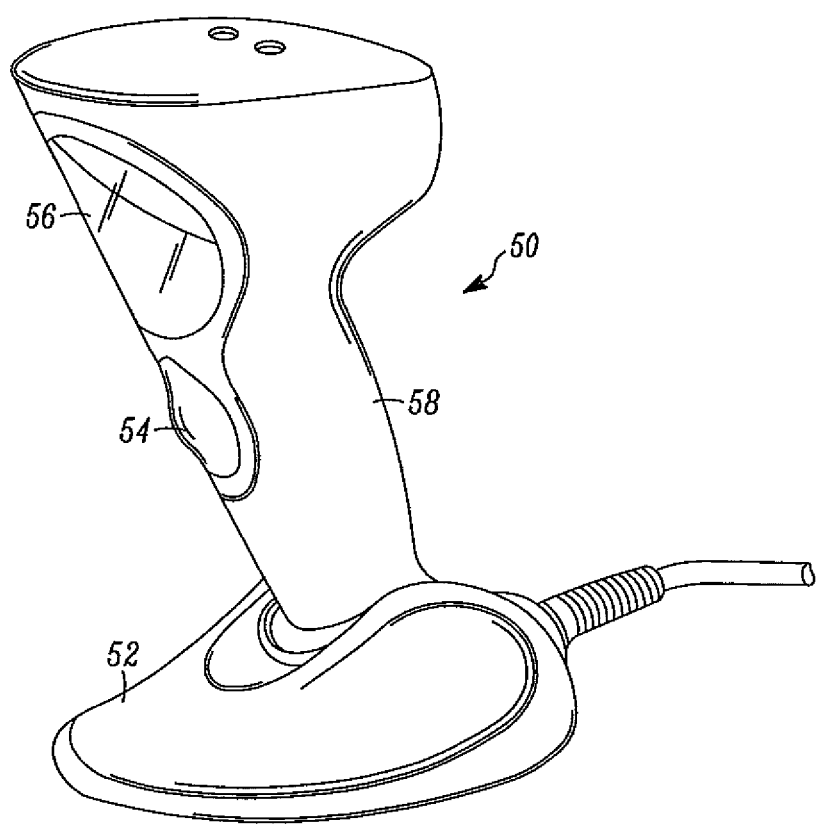
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
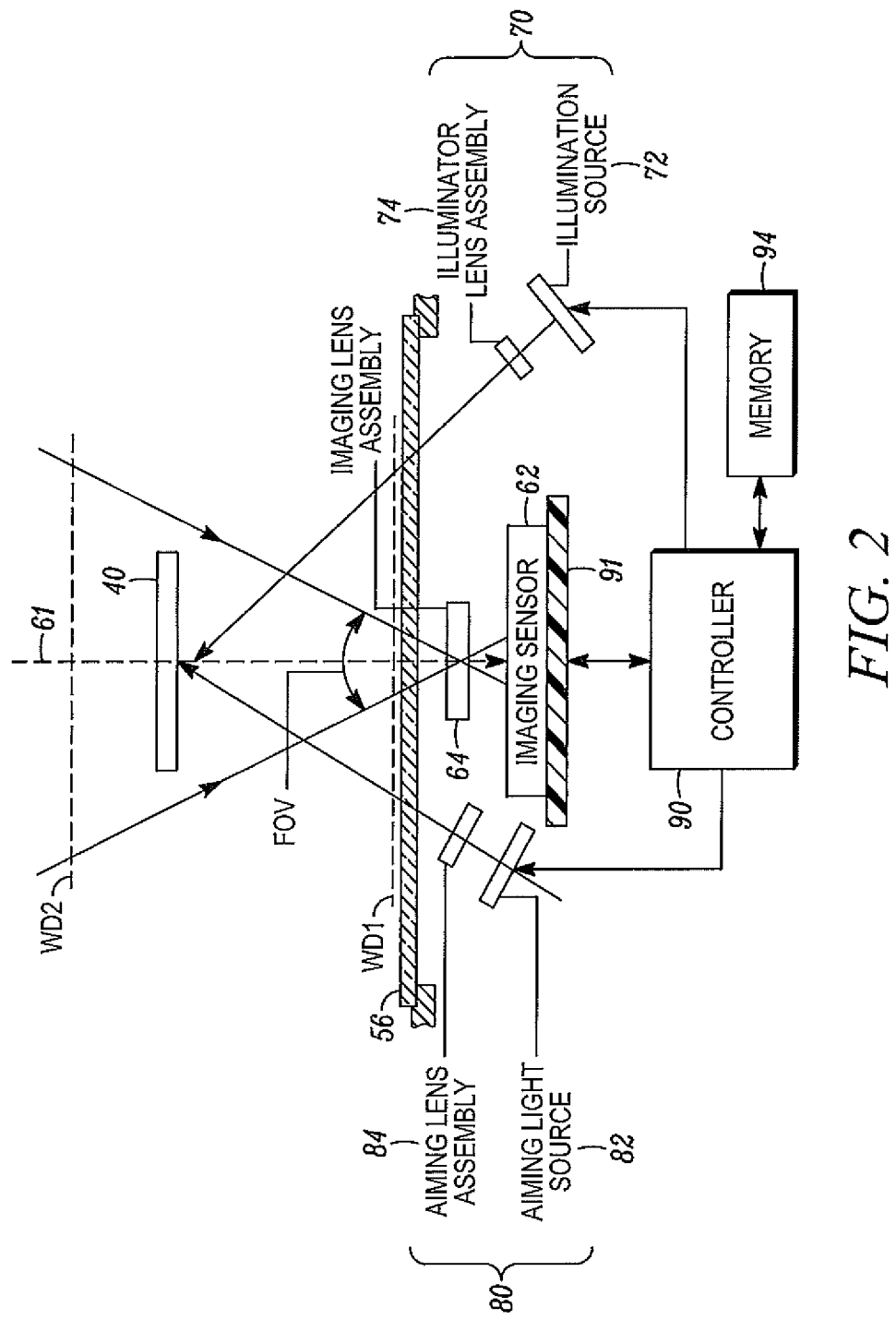
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 64; (2) an illuminating lens arrangement 74 positioned in front of an illumination source 72; (3) an aiming lens arrangement 84 positioned in front of an aiming light source 82; and (4) a controller 90. In FIG. 2, the imaging lens arrangement 64, the illuminating lens arrangement 74, and the aiming lens arrangement 84 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 64 along an optical path or axis 61 through the window 56. Generally, the imaging sensor 62 and the imaging lens arrangement 64 are designed to operate together for capturing light scattered or reflected from a barcode 40 as pixel data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 64. Some of the imaging scanners can include an auto-focus system to enable a barcode be more clearly imaged with the imaging sensor 62 based on the measured distance of this barcode. In some implementations of the auto-focus system, the focus length of the imaging lens arrangement 64 is adjusted based on the measured distance of the barcode. In some other implementations of the auto-focus system, the distance between the imaging lens arrangement 64 and the imaging sensor 62 is adjusted based on the measured distance of the barcode.

In FIG. 2, the illuminating lens arrangement 74 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens arrangement 84 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

An imaging scanner generally also has a battery inside its housing. The user often needs to know the state of charge of the battery to estimate how long the battery can continue power the device and to decide whether the battery needs to be recharged or replaced. Unlike cell phones, many imaging scanners do not have the display screen for displaying the state of charge. While many cell phones can use some graphic images or icons (e.g., the "3 bars" graphic image) on its display to show the state of charge about its battery, an imaging scanner without the display screen may have to use other techniques to inform the user the state of charge about its battery. Some of the existing battery operated cordless imaging scanner do not provide the state of charge on the battery. They only report when the battery is very low and is in need of a charge. It would be nice for a customer to be able to determine the state of charge before leaving the charge area such as in an industrial warehouse setting so they can switch to a scanner that has more charge. Sometimes, even if an imaging scanner already has a display screen, it may still be desirable to show the state of charge without using the display screen.

Figure 3:
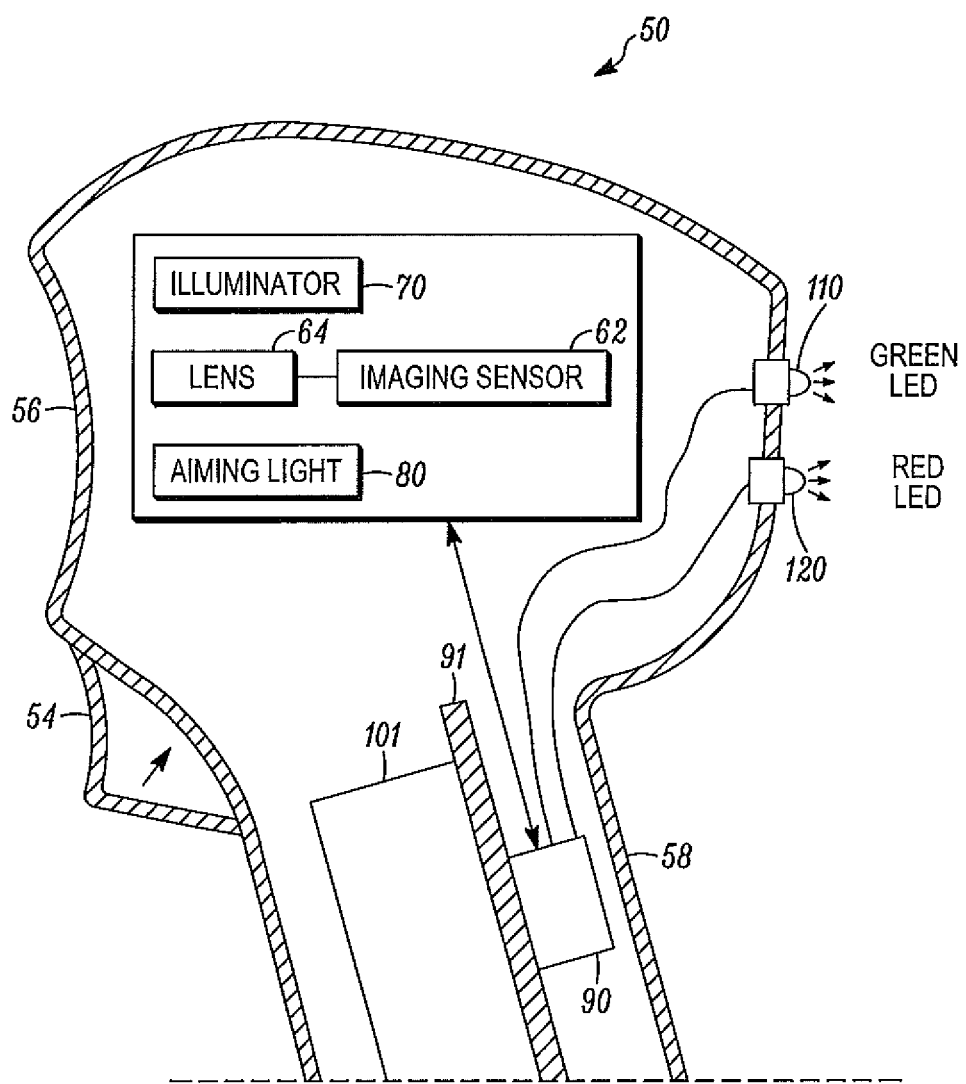
FIG. 3 is a schematic of an imaging scanner with two light indicators that can be configured to reveal the state of charge on the battery inside the imaging scanner in accordance with some embodiments.

FIG. 3 is a schematic of an imaging scanner with two light indicators that can be configured to reveal the state of charge on the battery inside the imaging scanner in accordance with some embodiments. In FIG. 3, the imaging scanner 50 includes the illuminator 70, the aiming light 80, the lens 64, the imaging sensor 62, and the controller 90. The imaging scanner 50 in FIG. 3 also includes a battery 101 inside the housing 58, and a green LED 110, and a red LED 120. After the user created certain predetermined triggering event (such as pressing and releasing a trigger), the green LED 110 is configured to emit green light for a duration of a first time period $T_1$, and the red LED 120 is configured to emit red light for a duration of a second time period $T_2$. In one embodiment, the percentage of the first time period relative to the sum of the first time period and the second time period—i.e., $T_1/(T1+T_2)$—is configured to represent approximately the percentage of energy remaining in the battery relative to the total energy in the battery that is fully charged.

Figure 4A:
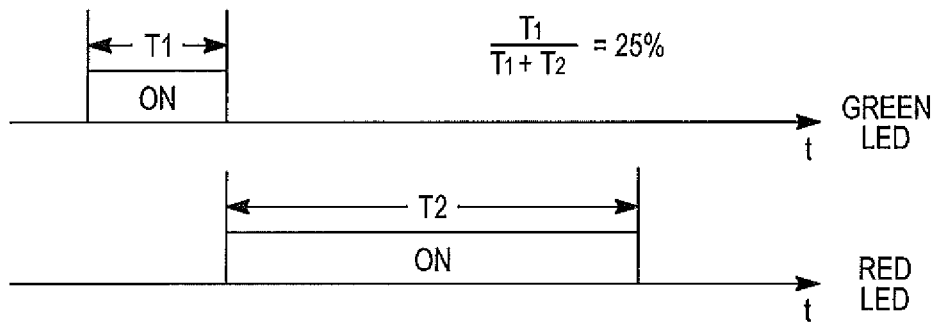
FIGS. 4A-4C depict the timing diagrams when the green LED and the red LED are configured to emit light sequentially for representing the state of charge on the battery in accordance with some embodiments.
Figure 4B:
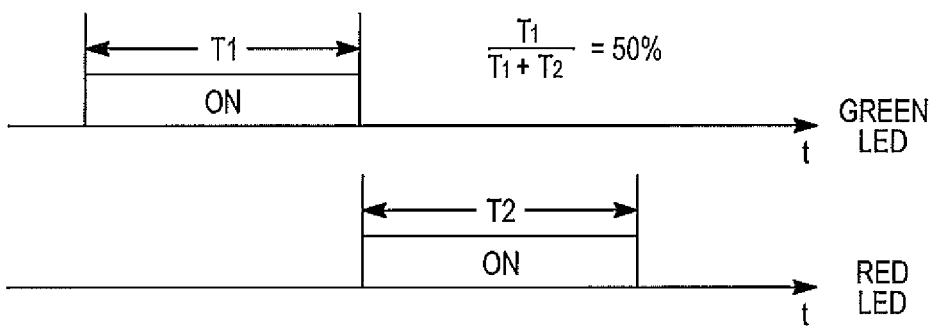
Figure 4C:
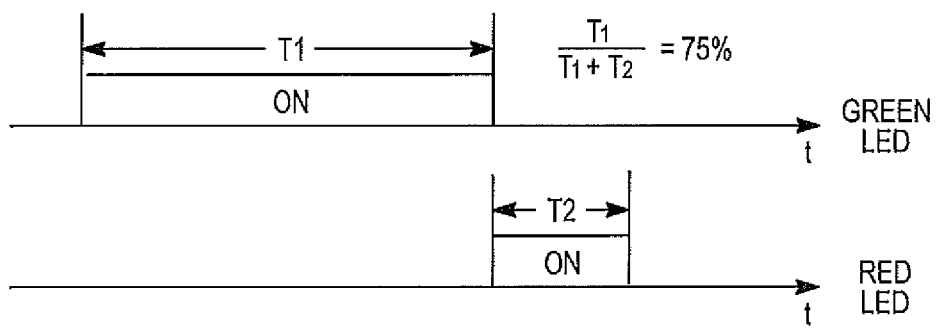
Figure 5A:
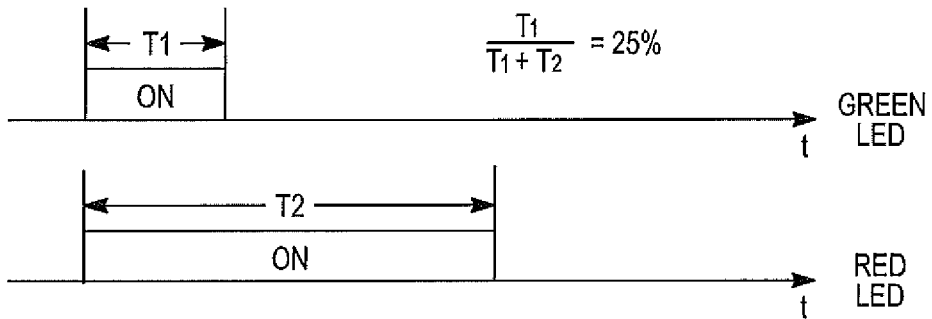
FIGS. 5A-5C depict the timing diagrams when the green LED and the red LED are configured to emitting light beginning substantially at the same time but with different durations in order to represent the state of charge on the battery in accordance with some embodiments.
Figure 5B:
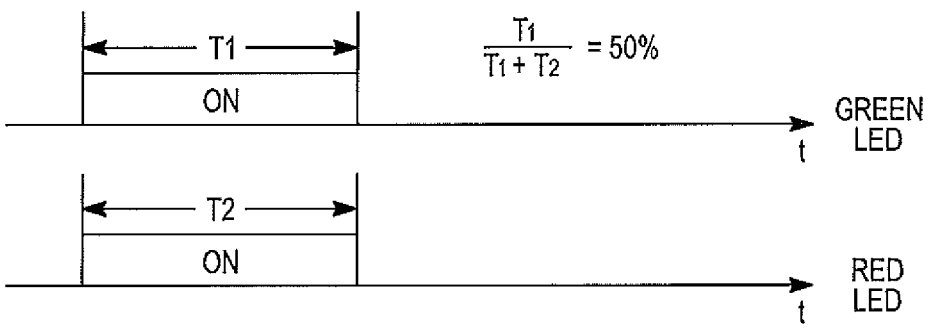
Figure 5C:
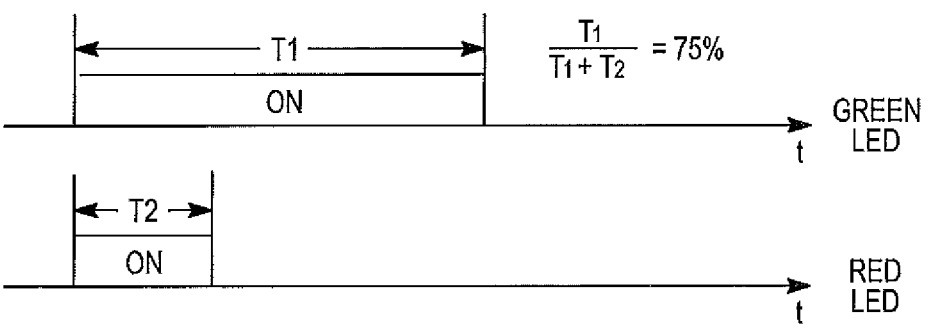

FIGS. 4A-4C depict the timing diagrams when the green LED 110 and the red LED 120 are configured to emit light sequentially for representing the state of charge on the battery in accordance with some embodiments. FIGS. 5A-5C depict the timing diagrams when the green LED 110 and the red LED 120 are configured to emitting light beginning substantially at the same time but with different durations in order to represent the state of charge on the battery in accordance with some embodiments. In FIG. 4A and FIG. 5A, $T_1/(T1+T_2)=25\%$ is configured to represent approximately that the percentage of energy remaining in the battery is about 25% of the total energy in the battery that is fully charged. In FIG. 4B and FIG. 5B, $T_1/(T1+T_2)=50\%$ is configured to represent approximately that the percentage of energy remaining in the battery is about 50% of the total energy in the battery that is fully charged. In FIG. 4C and FIG. 5C, $T_1/(T1+T_2)=75\%$ is configured to represent approximately that the percentage of energy remaining in the battery is about 75% of the total energy in the battery that is fully charged.

In addition to the embodiments as shown in FIGS. 4A-4C and FIGS. 5A-5C, the green LED 110 and the red LED 120 can also be configured to emit light with other timing diagrams. For example, the first time period $T_1$ and the second time period $T_2$ can have overlap but without starting at the same time; alternatively, the first time period $T_1$ and the second time period $T_2$ can also have no overlap and they can even be separated by a time period during which no light is emitted from either the green LED 110 or the red LED 120. Other functional relationship between the first time period $T_1$ and the second time period $T_2$ can also be used to reveal the state of charge on the battery. When any of these functions—including the function $T_1/(T_1+T_2)$—is properly implemented, the ratio between the first time period $T_1$ and the second time period $T_2$ monotonically depends upon the state of charge on the battery. In one example, the more energy remains in the battery, the longer the time period for the green light is emitted relative to that for the red light. When the ratio $T_1:T_2=T_1:0$ (i.e., only green light from the green LED 110 can be observed), it may mean that the battery is fully charged. Conversely, when the ratio $T_1:T_2 \approx 0:T_2$ (i.e., essentially only red light from the red LED 120 can be observed), it may mean that the battery is nearly empty. When the ratio $T_1:T_2=1:1$ (i.e., the green LED 110 and the red LED 120 are tuned on for nearly equal amount of time), it may mean that the battery is half charged or halt empty.

In other embodiments, the green LED 110 and the red LED 120 can be replaced with light indicators emitting other colors. These light indicators do not have to be LEDs. In addition, these light indicators can also play other functions when they are not used for revealing the state of charge on the battery. For example, some of the existing barcode scanners have a green LED to signal good decode and a red LED to signal communication errors. These existing LEDs are only used after a barcode has been decoded. With proper implementations, these existing green and red LEDs can also be used as the light indicators for revealing the state of charge on the battery. In one implementation, for example, if the trigger 54 in FIG. 3 is pressed and then released without decoding a barcode, a predetermined triggering event can be generated to make the existing green LED and red LED to function as the light indicators for revealing the state of charge on the battery. Such implementation allows a user to press and release the trigger 54 and watch the LEDs for state of charge. In other implementations, the predetermined triggering event for tuning on the light indicators to reveal the state of charge on the battery can be generated by a separate and dedicated button that is different from the trigger 54 as shown in FIG. 3. In some embodiments, another green LED (which is different from the existing green LED for signaling good decode) and another red LED (which is different from the existing red LED for signaling communication errors) can be used as the light indicators for revealing the state of charge on the battery.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    an housing;
    an illumination source operative to generate an illumination light projected towards a target object;
    an imaging sensor in the housing for detecting light from a barcode on the target object with an array of photosensitive elements in the imaging sensor to create pixel data during an exposure time period while the barcode is illuminated by the illumination light at least during a part of the exposure time period;
    a controller for processing the pixel data to decode an image of the barcode;
    a battery in the housing for powering at least one of the illumination source, the imaging sensor, and the controller;
    a first light indicator operative to emit light in a first color for a duration of a first time period after a predetermined triggering event;

a second light indicator operative to emit light in a second color for a duration of a second time period after the predetermined triggering event; and wherein the percentage of the first time period relative to the sum of the first time period and the second time period is configured to be a monotonic function of the percentage of energy remaining in the battery relative to the total energy in the battery that is fully charged.

2. The apparatus of claim 1, wherein one of the first light indicator and the second light indicator is operative to indicate an event that the image of the barcode is successfully decoded.

3. The apparatus of claim 1, wherein the percentage of the first time period relative to the sum of the first time period and the second time period is configured to represent approximately the percentage of energy remaining in the battery relative to the total energy in the battery that is fully charged.

4. The apparatus of claim 1, wherein the percentage of the first time period relative to the sum of the first time period and the second time period as perceived by an user linearly depends upon the percentage of energy remaining in the battery relative to the total energy in the battery that is fully charged.

5. The apparatus of claim 1, wherein each one of the first light indicator and the second light indicator includes a light emitting diode (LED).

6. The apparatus of claim 1, wherein the first light indicator is operative to emit light in green color.

7. The apparatus of claim 1, wherein the second light indicator is operative to emit light in red color.

8. The apparatus of claim 1, wherein the first light indicator is operative to emit light in green color, and the second light indicator is operative to emit light in red color.

9. The apparatus of claim 1, wherein the first light indicator is operative to indicate a first operation condition that the image of the barcode is successfully decode, and the second light indicator is operative to indicate a second operation condition.

10. The apparatus of claim 1, further comprising a trigger, and wherein the predetermined triggering event is an event that the trigger is pulled.

11. The apparatus of claim 1, further comprising a trigger, and wherein the predetermined triggering event is an event that the trigger the trigger is pulled and released without causing decoding of the barcode.

12. An apparatus comprising:
an housing;
an illumination source operative to generate an illumination light projected towards a target object;
an imaging sensor in the housing for detecting light from a barcode on the target object with an array of photosensitive elements in the imaging sensor to create pixel data during an exposure time period while the barcode is illuminated by the illumination light at least during a part of the exposure time period;
a controller for processing the pixel data to decode an image of the barcode;
a battery in the housing for powering at least one of the illumination source, the imaging sensor, and the controller;
means for causing a first light indicator to emit light in a first color for a duration of a first time period after a predetermined triggering event;

means for causing a second light indicator to emit light in a second color for a duration of a second time period after the predetermined triggering event; and wherein the percentage of the first time period relative to the sum of the first time period and the second time period is configured to be a monotonic function of the percentage of energy remaining in the battery relative to the total energy in the battery that is fully charged.

13. A method of operating an barcode reader, the barcode reader comprising (a) a housing, (b) illumination source, (c) an imaging sensor in the housing, and (d) a battery in the housing for powering at least one of the illumination source and the imaging sensor, the method comprising:
monitoring a state of charge on the battery;
detecting an predetermined triggering event without causing decoding of a barcode;
causing a first light indicator to emit light in a first color for a duration of a first time period after the predetermined triggering event;
causing a second light indicator to emit light in a second color for a duration of a second time period after the predetermined triggering event; and
wherein the percentage of the first time period relative to the sum of the first time period and the second time period is configured to be a monotonic function of the percentage of energy remaining in the battery relative to the total energy in the battery that is fully charged.

14. The method of claim 13, wherein one of the first light indicator and the second light indicator is operative to indicate an event that an image of the barcode is successfully decoded.

15. The method of claim 13, comprising:
representing approximately the percentage of energy remaining in the battery relative to the total energy in the battery in fully charged state with the percentage of the first time period relative to the sum of the first time period and the second time period.

16. The method of claim 13, comprising:
representing the percentage of energy remaining in the battery relative to the total energy in the battery in fully charged state with the percentage of the first time period relative to the sum of the first time period and the second time period as perceived by an user.

17. The method of claim 13, comprising:
causing the first light indicator to emit light in the first color and the second light indicator to emit light in the second color sequentially.

18. The method of claim 13, comprising:
causing the first light indicator to begin emitting light in the first color and the second light indicator to begin emitting light in the second color substantially at the same time.

19. The method of claim 13, further comprising:
pulling a trigger on the barcode reader to create the predetermined triggering event.

20. The method of claim 13, further comprising:
pulling and releasing a trigger on the barcode reader to create the predetermined triggering event without causing decoding of the barcode.

* * * * *